(12) United States Patent
Schraudolph

(10) Patent No.: US 10,182,582 B2
(45) Date of Patent: Jan. 22, 2019

(54) BEVERAGE DISPENSING APPARATUS, METHOD OF DISPENSING A BEVERAGE, BEVERAGE BREWING MACHINE AND METHOD OF BREWING A BEVERAGE

(71) Applicant: XentiQ Partners Pte Ltd, Singapore (SG)

(72) Inventor: Ulrich Schraudolph, Singapore (SG)

(73) Assignee: XENTIQ PARTNERS PTE LTD, Singapore (SG)

( * ) Notice: Subject to any disclaimer, the term of this patent is extended or adjusted under 35 U.S.C. 154(b) by 510 days.

(21) Appl. No.: 14/790,455

(22) Filed: Jul. 2, 2015

(65) Prior Publication Data

US 2016/0000256 A1 Jan. 7, 2016

(30) Foreign Application Priority Data

Jul. 3, 2014 (SG) .......................... 10201403823X

(51) Int. Cl.
*A23F 5/24* (2006.01)
*A23F 3/16* (2006.01)
*A23F 3/18* (2006.01)
*A47J 31/06* (2006.01)

(52) U.S. Cl.
CPC .................. *A23F 5/24* (2013.01); *A23F 3/16* (2013.01); *A23F 3/18* (2013.01); *A47J 31/0615* (2013.01)

(58) Field of Classification Search
CPC ...... A23F 3/16; A23F 3/18; A23F 5/24; A47J 31/0615; A47J 31/4403
USPC .............................. 222/544; 426/431; 99/288
See application file for complete search history.

(56) References Cited

U.S. PATENT DOCUMENTS

| | | | | |
|---|---|---|---|---|
| 2011/0097465 | A1* | 4/2011 | Bishop | A47J 31/32 426/431 |
| 2012/0219686 | A1* | 8/2012 | Bombeck | A47J 31/043 426/431 |
| 2013/0133524 | A1* | 5/2013 | Vastardis | A47J 31/4403 99/300 |

* cited by examiner

*Primary Examiner* — Dana Ross
*Assistant Examiner* — Joe E Mills, Jr.
(74) *Attorney, Agent, or Firm* — Hultquist, PLLC; Steven J. Hultquist

(57) ABSTRACT

A beverage dispensing apparatus having a beverage chamber adapted to contain a liquid, an inlet adapted to allow the liquid to flow in but not out; a dispensing opening adapted to retain the liquid within the beverage chamber by capillary effect, the dispensing opening adapted to allow the liquid therethrough to flow out, such that the dispensing opening is subjected to a liquid pressure when the beverage chamber contains the liquid; and a pressure changer operable to decrease the liquid pressure at the dispensing opening; such that the pressure changer is adapted to decrease the liquid pressure when the liquid flows in so as to retain the liquid within the beverage chamber by surface tension of the liquid due to the capillary effect and ambient pressure at the dispensing opening. A method of dispensing the beverage, a beverage brewing apparatus and a method of brewing the beverage is also provided.

14 Claims, 7 Drawing Sheets

BEVERAGE DISPENSING APPARATUS, METHOD OF DISPENSING A BEVERAGE, BEVERAGE BREWING MACHINE AND METHOD OF BREWING A BEVERAGE

CROSS-REFERENCE TO RELATED APPLICATIONS

This application claims priority under the provisions of 35 USC 119 to Singapore Patent Application No. 10201403823X filed on Jul. 3, 2014. The disclosure of Singapore Patent Application No. 10201403823X is hereby incorporated herein by reference, in its entirety, for all purposes.

TECHNICAL FIELD

The present invention relates to a beverage dispensing apparatus, a method of dispensing a beverage, a beverage brewing machine and a method of brewing a beverage.

BACKGROUND

Tea has been one of the most widely consumed beverages in the world. Besides the quality of tea leaves used, the quality of tea is also dependent on the way the tea is brewed, i.e. the brewing process applied. To brew a good quality tea, the temperature, timing and apparatus used to brew the tea leaves need to be correctly controlled. In a commercial, professional food and beverage environment, compliance with such parameters may be difficult, time consuming. Consequently, it may lead to inherent inconsistencies in the quality of the brewed tea.

There are apparatus known for brewing tea. Conventionally, apparatus as such utilizes mechanical valves to dispense the beverage. It is known that the use of such apparatus with mechanical valve could affect the taste and purity of the tea. Further, the mechanical valves may not be aesthetically pleasing. Therefore, it is advantageous to have an apparatus that has minimum effect on the taste and purity of the tea.

SUMMARY

According to various embodiments, a beverage dispensing apparatus is provided. The beverage dispensing apparatus includes a beverage chamber adapted to contain a liquid, an inlet adapted to allow the liquid to flow into but not out of the beverage chamber, a dispensing opening adapted to retain the liquid within the beverage chamber by capillary effect, the dispensing opening adapted to allow the liquid therethrough to flow out of the beverage chamber, wherein the dispensing opening is subjected to a liquid pressure when the beverage chamber contains the liquid and a pressure changer operable to decrease the liquid pressure at the dispensing opening such that the pressure changer is adapted to decrease the liquid pressure when the liquid flows into the beverage chamber so as to retain the liquid within the beverage chamber by surface tension of the liquid due to the capillary effect and ambient pressure at the dispensing opening.

According to various embodiments, the pressure changer may be operable to increase the liquid pressure at the dispensing opening to overcome the surface tension and ambient pressure to dispense the liquid via the dispensing opening.

According to various embodiments, the dispensing opening may include a tube extending from the beverage chamber.

According to various embodiments, the length of the tube may be at least three times the diameter of the dispensing opening.

According to various embodiments, the beverage chamber may include a top portion and a bottom portion, the top portion disposed above the bottom portion, such that the inlet and the pressure changer may be disposed at the top portion and the dispensing opening may be disposed at the bottom portion.

According to various embodiments, the liquid may flow into the beverage chamber via a force external to the beverage chamber.

According to various embodiments, the pressure changer may include the dispensing opening.

According to various embodiments, the pressure changer may include a fluid pump adapted to pump fluid out of the beverage chamber.

According to various embodiments, the fluid pump may include an air pump.

According to various embodiments, the pressure changer may include an air valve adapted to release air into the beverage chamber to increase the liquid pressure so as to dispense the liquid via the dispensing opening.

According to various embodiments, the beverage chamber may include a pressure release check valve in fluid communication with the beverage chamber, such that the pressure release check valve may be adapted to release an excess pressure above ambient pressure within the beverage chamber.

According to various embodiments, the beverage dispensing apparatus may include a heating chamber in fluid communication with the beverage chamber via a fluid connection, the fluid connection being connected to the beverage chamber via the inlet, such that the heating chamber may be adapted to heat the liquid before transferring the liquid into the beverage chamber to brew the beverage.

According to various embodiments, the beverage dispensing apparatus may include a fluid return conduit connecting the heating chamber to the beverage chamber, such that a closed pressure loop may be formed by at least the beverage chamber, fluid connection, heating chamber and return conduit, such that when the liquid may be channeled from the heating chamber into the beverage chamber via the fluid connection, an under pressure zone formed in the heating chamber by the channeled away liquid draws the air from the beverage chamber into the heating chamber via the return conduit thereby maintaining the pressure within the pressure loop.

According to various embodiments, the beverage dispensing apparatus may include a pressure release check valve in fluid communication with the beverage chamber, such that the pressure release check valve may be adapted to release an excess pressure above ambient pressure within the beverage chamber.

According to various embodiments, the beverage dispensing apparatus may include a fluid control valve disposed along the fluid connection, the fluid control valve may be adapted to control fluid flow from the heating chamber to the beverage chamber.

According to various embodiments, the beverage dispensing apparatus may include an air pump in fluid communication with the beverage chamber, such that the air pump may be adapted to pump air out of the beverage chamber.

According to various embodiments, the beverage dispensing apparatus may include a pre-heating chamber fluidly connected to the heating chamber, the pre-heating chamber may be adapted to contain and heat the liquid before channeling it into the heating chamber.

According to various embodiments, a valve may be disposed between the pre-heating chamber and the heating chamber, such that the valve may be adapted to control the liquid flow from the pre-heating chamber into the heating chamber.

According to various embodiments, a method of dispensing a beverage from a beverage dispensing apparatus is provided. The method includes containing a liquid in the beverage chamber, allowing the liquid flow into but not out of the beverage chamber, retaining the liquid within the beverage chamber by capillary effect at a dispensing opening of the beverage chamber, the dispensing opening adapted to allow the liquid therethrough to flow out of the beverage chamber, such that the dispensing opening may be subjected to a liquid pressure when the beverage chamber contains the liquid and decreasing the liquid pressure at the dispensing opening when the liquid may be flowing into the beverage chamber so as to retain the liquid within the beverage chamber by surface tension of the liquid due to the capillary effect and ambient pressure at the dispensing opening.

According to various embodiments, the method may include increasing the liquid pressure at the dispensing opening to overcome the surface tension and ambient pressure to dispense the liquid from the beverage chamber via the dispensing opening.

According to various embodiments, decreasing the liquid pressure may include pumping a fluid out of the beverage chamber.

According to various embodiments, the fluid may be air.

According to various embodiments, increasing the liquid pressure within the beverage chamber may include releasing air into the beverage chamber so as to dispense the liquid via the dispensing opening.

According to various embodiments, the method may include releasing an excess pressure above ambient pressure within the beverage chamber.

According to various embodiments, the method may include heating the liquid in a heating chamber before transferring the liquid into the beverage chamber to brew the beverage.

According to various embodiments, the method may include forming a closed pressure loop between the beverage chamber, the heating chamber, a fluid connection and a return conduit between the beverage chamber and the heating chamber, such that when the liquid is channeled from the heating chamber into the beverage chamber via the fluid connection, a under pressure zone may be formed in the heating chamber by the channeled away liquid draws the air from the beverage chamber into the heating chamber via the return conduit thereby maintaining the pressure within the pressure loop.

According to various embodiments, the method may include controlling the fluid flow from the heating chamber to the beverage chamber.

According to various embodiments, the method may include pre-heating the liquid before channeling it into the heating chamber.

According to various embodiments, the method may include controlling the pre-heated liquid flow into the heating chamber.

According to various embodiments, a beverage brewing machine is provided. The beverage brewing machine includes a pre-heating chamber adapted to heat a liquid therein to a first temperature, a heating chamber adapted to receive the liquid from the pre-heating chamber and heat the liquid to a second temperature for brewing a beverage and a beverage dispensing apparatus may be adapted to receive the liquid from the heating chamber to brew the beverage and dispense the beverage from it, such that the heating chamber may be adapted to heat the liquid while the beverage dispensing apparatus is brewing the beverage.

According to various embodiments, the first temperature may be lower than the second temperature.

According to various embodiments, the pre-heating chamber may have a first capacity and the heating chamber may have a second capacity, such that the first capacity of the pre-heating chamber may be at least equal to the second capacity of the heating chamber.

According to various embodiments, the beverage dispensing apparatus may include a beverage chamber adapted to contain a liquid, an inlet adapted to allow the liquid to flow into but not out of the beverage chamber, a dispensing opening adapted to retain the liquid within the beverage chamber by capillary effect, the dispensing opening adapted to allow the liquid therethrough to flow out of the beverage chamber, wherein the dispensing opening may be subjected to a liquid pressure when the beverage chamber contains the liquid and a pressure changer operable to decrease the liquid pressure at the dispensing opening, and such that the pressure changer may be adapted to decrease the liquid pressure when the liquid flows into the beverage chamber so as to retain the liquid within the beverage chamber by surface tension of the liquid due to the capillary effect and ambient pressure at the dispensing opening.

According to various embodiments, the capacity of the pre-heating chamber may be at least two times the capacity of the heating chamber.

According to various embodiments, brewing a beverage includes heating a liquid in a pre-heating chamber to a first temperature, transferring the liquid from the pre-heating chamber to a heating chamber, heating the liquid in a heating chamber to a second temperature for brewing a beverage, transferring the liquid from the heating chamber to a beverage chamber, and brewing the beverage in the beverage chamber while the heating chamber may be heating the liquid.

According to various embodiments, the method may include dispensing the beverage from the beverage chamber.

According to various embodiments, the first temperature may be lower than the second temperature.

The present invention may address the challenges in the design of such a machine in order to make the brewing automated and fast without compromising the optimal brewing process parameters. It also addresses the dispensing of the tea, to make it elegant and pure (exposure to materials and components) and provide a natural device layout which visualizes the steps of the brewing process to the operator.

The present invention provides a "valve-less" dispensing opening and also allows easy attachment and detachment of the beverage chamber. This is beneficial as the rinsing and loading of beverage elements, e.g. tea leaves. Without additional components and parts, cleaning of the beverage chamber would be easier.

DETAILED DESCRIPTION

Various features in various embodiments may be combined to form further embodiments.

Figure 1:
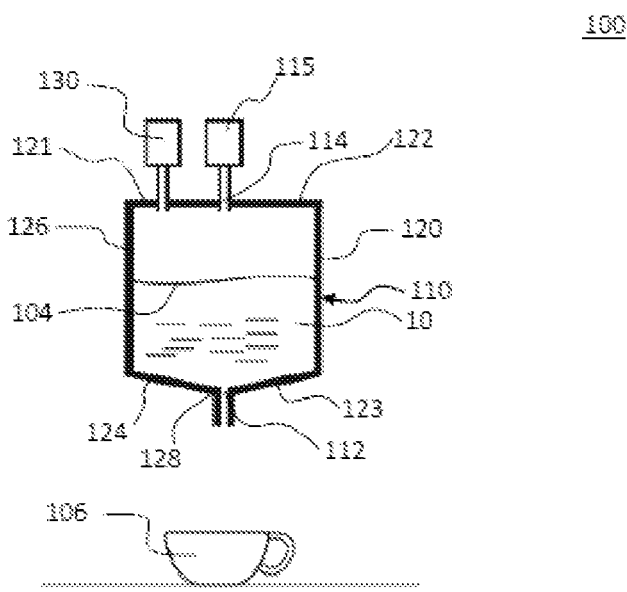
FIG. 1 shows a beverage dispensing apparatus according to various embodiments.

FIG. 1 shows a beverage dispensing apparatus 100. Beverage dispensing apparatus 100 has a beverage chamber 110 adapted to contain a liquid 10, an inlet 114 adapted to allow the liquid 10 to flow into but not out of the beverage chamber 110, a dispensing opening 112 adapted to retain the liquid 10 within the beverage chamber 110 by surface tension effect or capillary effect. Capillary effect s used herein may refer to the effect of the adhesive force between the liquid 10 and a surface portion of the beverage chamber 110 which the liquid 10 contacts to adhere the liquid 10 to the beverage chamber 110 and the effect of the surface tension of the liquid 10 to retain the liquid 10 within the beverage chamber 110. The dispensing opening 112 is adapted to allow the liquid 10 therethrough to flow out of the beverage chamber 110, such that the dispensing opening 112 is subjected to a liquid pressure when the beverage chamber 110 contains the liquid 10. Beverage dispensing apparatus 100 has a pressure changer 130 operable to decrease the liquid pressure at the dispensing opening 112. Pressure changer 130 is adapted to decrease the liquid pressure when the liquid 10 flows into the beverage chamber 110 so as to retain the liquid 10 within the beverage chamber 110 by surface tension of the liquid 10 due to the capillary effect and ambient pressure at the dispensing opening 112.

Pressure changer 130 may be adapted to keep the liquid pressure at a pressure which is low enough to retain the liquid 10 in the beverage chamber 110.

Beverage dispensing apparatus 100 may be adapted to brew a liquid 10, e.g. beverage like tea or coffee, and dispense the liquid 10 into a container 106, e.g. a cup, bottle. As shown in FIG. 1, the inlet 114 and the pressure changer 130 may be fluidly connected to beverage chamber 110.

Referring to FIG. 1, the beverage chamber 110 may include a top portion 122 and a bottom portion 124, the top portion 122 being disposed above the bottom portion 124, such that the inlet 114 and the pressure changer 130 may be disposed at the top portion 122 and the dispensing opening 112 may be disposed at the bottom portion 124. The beverage chamber 110 may include a chamber housing 120 with a top wall portion 121 at about one end of the chamber housing 120, a bottom wall portion 123 at about the other end of the chamber housing 120 opposite the one end and a circumferential wall portion 126 extending from the top wall portion 121 to the bottom wall portion 123. Top portion 122 may include top wall portion 121. Top portion 122 may include a portion of circumferential wall portion 126 which extends downwards from the top wall portion 121 towards the bottom wall portion 123. Similarly, the bottom portion 124 may include the bottom wall portion 123. Bottom portion 124 may include a portion of the circumferential wall portion 126 which extend upwards from the bottom wall portion 123 towards the top wall portion 121. Dispensing opening 112 may be fluidly connected to the chamber housing 120 at about the bottom wall portion 123.

Beverage chamber 110 may be a closed chamber such that fluid is prevented from communicating with the inside of the beverage chamber 110 via the inlet 114 and the pressure changer 130 and the dispensing opening 112 when the liquid 10 is in the beverage chamber 110. Inlet 114 and pressure changer 130 may be closed to prevent fluid flow into the beverage chamber 110. Dispensing opening 112 would be closed by the liquid 10 when the liquid 10 is in the beverage chamber 110. As a skilled person may understand, when fluid communication is prevented via the inlet 114, the pressure changer 130, and the dispensing opening 112, the pressure within the chamber may be maintained. As such, liquid 10 may be retained within the chamber housing 120 due to the surface tension of the liquid 10 and atmospheric pressure. Consequently, the liquid 10 may be prevented from being dispensed from the beverage chamber 110. As may be appreciated by the skilled person, by controlling the pressure within the beverage chamber 110, the liquid 10 may be dispensed in a controlled manner as will be explained later.

Beverage chamber 110 may include a partition, e.g. a filter or sieve (not shown in FIG. 1) to retain beverage elements, e.g. tea leaves, coffee powder, from reaching the dispensing opening 112. Partition may extend parallel to the top wall portion 121 of the chamber housing 120 and across the chamber housing 120. Partition may be spaced from the dispensing opening 112.

Bottom wall portion 123 may be tapered such that the bottom wall portion 123 may be sloped to an apex 128 so as to enable the liquid 10 within the beverage chamber 110 to flow to the apex 128. Bottom wall portion 123 may extend from the circumferential wall portion 126 away from the top wall portion and towards the apex 128. As shown in FIG. 1, the apex 128 may be dispose opposite the top wall portion 121 of the beverage chamber 110. Apex 128 may be pointing away from the top wall portion 121.

Pressure changer 130 may be a device for changing the liquid pressure of the liquid 10 at the dispensing opening 112. Liquid pressure at the dispensing opening 112 may be the weight of the liquid 10 and the air pressure of the air within the beverage chamber 110 acting onto the liquid 10. Pressure changer 130 may be operated to pump fluid, e.g. air, into or out of the beverage chamber 110 thereby increasing or decreasing the air pressure in the beverage chamber 110 correspondingly. By increasing the air pressure in the beverage chamber 110, the liquid 10 would experience a downward force exerted by the air. As the air pressure increases, the liquid pressure at the dispensing opening 112 may correspondingly increase. Liquid pressure at the dispensing opening 112 may increase to a magnitude that exceeds the surface tension of the liquid 10 against the dispensing opening 10 and the atmospheric pressure. When that happens, the liquid 10 may be dispensed out of the beverage chamber 110 into the container 106. By decreasing the air pressure in the beverage chamber 110, the liquid pressure is reduced. The air pressure within the beverage chamber 110 may be reduced to a level lower than the ambient pressure. Consequently, air may be introduced into the beverage chamber 110 via the dispensing opening 112 due to the higher atmospheric pressure.

Pressure changer 130 may include a fluid pump adapted to pump fluid out of the beverage chamber 110. Pressure changer 130 may introduce fluid into the beverage chamber 110. Pressure changer 130 may include the dispensing opening 112. When more liquid 10 is being added into the beverage chamber 110, the liquid pressure at the dispensing opening 112 may increase. If the liquid 10 pressure exceeds the force exerted by the surface tension of liquid 10 and the atmospheric pressure, the liquid 10 may flow out of the beverage chamber 110 via the dispensing opening 112. As the liquid 10 is being dispensed from the dispensing opening 112, the liquid pressure at the dispensing opening 112 may decrease until the liquid 10 can be retained by the atmospheric pressure and surface tension of the liquid 10. As such, the dispensing opening 112 is adapted to decrease the pressure at the dispensing opening 112. Fluid pump may be an air pump.

Dispensing opening 112 may be disposed at about the lowest portion of the beverage chamber 110, e.g. apex 128, such that liquid 10 within the beverage chamber 110 may flow to the dispensing opening 112 by gravitational forces and to be dispensed from the beverage chamber 110. As described, dispensing opening 112 may be disposed at the apex 128. Dispensing opening 112 may have an opening diameter. It would be clear to a skilled person that the opening diameter of the dispensing opening 112 has to be wide enough for the liquid 10 to be held within the beverage chamber 110 by atmospheric pressure. Depending on the type of beverage that the beverage dispensing apparatus 100 may be used for, the opening diameter of the dispensing opening 112 may be selected accordingly by the skilled person. The opening diameter of the dispensing opening 112 may be designed to vary according to a diameter suitable for retaining the liquid 10 within beverage chamber 110. The opening diameter may be less than 3 mm. Dispensing opening 112 may include a tube extending from the beverage chamber 110. Tube may extend in a direction away from the beverage chamber 110, e.g. downward. Dispensing opening 112 may extend towards the container 106 so as to direct the liquid 10 dispensed from the beverage chamber 110 towards the container 102. By having an elongated opening, the capillary effect of the liquid 10 on the dispensing opening 112 may be improved. The length of the tube may be at least three times the diameter of the dispensing opening 112. The length of the tube may be at least two times the diameter of the dispensing opening 112. Dispensing opening 112 may comprise of a plurality of openings (not shown in FIG. 1) with each of the plurality of openings having an opening diameter as described. Dispensing opening 112 may include a plurality of the tubes, each of the plurality of tubes may have an opening diameter as described such that each of the plurality of openings allow capillary effect to occur so as to retain the liquid 10 therein by surface tension.

Inlet 114 and pressure changer 130 may be fluidly connected to the chamber housing 120 at about the top wall portion 121. Inlet 114 may be disposed along the circumferential wall portion 126 of the chamber housing 120. Inlet 114 is adapted to provide fluid flow into the beverage chamber 110. Liquid 10 may flow into the beverage chamber via a force external to the beverage chamber, e.g. gravitational force, fluid pressure. For example, a compartment containing a liquid (not shown in FIG. 1) may be disposed above and fluidly connected to the beverage chamber 110 via the inlet 114 such that the liquid may be channeled into the beverage chamber 110 under the influence of gravity. Inlet 114 may be disposed above the liquid 10 such that the inlet 114 may be disposed above the surface level 104 of the liquid 10. Inlet 114 may be disposed below the surface level 104 of the liquid 10 such that fluid flow into the beverage chamber 110 may flow into the liquid 10 under pressure. The amount of liquid 10 within beverage chamber 110 may be controlled so as to control the surface level 104 of the liquid 10. As such, the surface level 104 may be controlled to be above or below the inlet 114 when the inlet 114 is along the circumferential wall portion 126.

A first fluid control valve 115 may be fluidly connected to the inlet 114. First fluid control valve 115 may be adapted to control fluid flow into the beverage chamber 210 via the inlet 114.

Beverage chamber 110 may include a closable entrance (not shown in FIG. 1) adapted to be opened to provide an entry point for adding of beverage elements, e.g. tea leaves, into the beverage chamber 110 and closed to seal the entrance thereby preventing fluid from flowing through the entrance.

Figure 2:
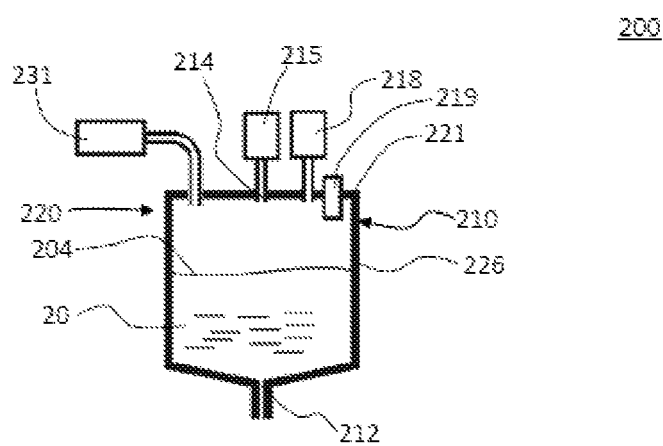
FIG. 2 shows another beverage dispensing apparatus according to various embodiments.

FIG. 2 shows an embodiment of the beverage dispensing apparatus 200. Beverage dispensing apparatus 200 includes the features in FIG. 1. Accordingly, the last two digits of the reference numerals of the features in FIG. 1 correspond with the same digits of the reference numerals of the features in FIG. 2. Beverage dispensing apparatus 200 may include beverage chamber 210, the inlet 214 to allow the liquid 20 to flow into the beverage chamber 210, and a dispensing opening 212 adapted to retain the liquid 20 within the beverage chamber 210 by capillary effect. The dispensing opening 212 is adapted to allow the liquid 10 therethrough to flow out of the beverage chamber 210. Dispensing opening 212 is subjected to a liquid pressure when the beverage chamber 210 contains the liquid 20. Beverage dispensing apparatus 200 has also a pressure changer operable to increase and/or decrease the liquid pressure at the dispensing opening 212. Pressure changer is adapted to decrease the liquid pressure when the liquid 20 flows into the beverage chamber 210 so as to retain the liquid 20 within the beverage chamber 210 by surface tension of the liquid 20 due to the capillary effect and ambient pressure at the dispensing opening 212.

Pressure changer 230 may include at least one of a fluid pump 231, an air valve 218, and a pressure release check valve 219. Fluid pump 231 may be fluidly connected to the beverage chamber 210 such that fluid pump 231 may be adapted to pump air out of the beverage chamber 210 to decrease the air pressure, and liquid pressure. Air valve 218 may be fluidly connected to the beverage chamber 210 such that the air valve 218 may be adapted to release air into the beverage chamber 210 to increase the liquid pressure so as to dispense the liquid 10 via the dispensing opening 212. Pressure release check valve 219 may be in fluid communication with the beverage chamber 210, such that the pressure release check valve 219 is adapted to release an excess pressure above ambient pressure within the beverage chamber 210.

First fluid control valve 215 may be connected to the inlet 214. First fluid control valve 215 may be adapted to control fluid flow or liquid flow into the beverage chamber 210 via the inlet 214.

Air valve 218 may be disposed at about the top wall portion 221. Air valve 218 may be disposed along the circumferential wall portion 226 of the chamber housing 220 instead. Air valve 218 is adapted to introduce fluid, e.g. air, into the beverage chamber 210 but does not allow fluid, e.g. air, out of the beverage chamber 210. Air valve 218 may be disposed above the liquid 20 such that the air valve 218 may be disposed above the surface level 204 of the liquid 20. A pump (not shown in FIG. 2) may be fluidly connected to the air valve 218 to pump fluid into the beverage chamber 210 to dispense the liquid 20.

Pressure release check valve 219 may be disposed at about the top wall portion 221. Pressure release check valve 219 may be disposed along the circumferential wall portion 226 of the chamber housing 220. Pressure release check valve 219 may be adapted to release fluid, e.g. air, into the atmosphere but does not allow air into the beverage chamber 210 therethrough. Pressure release check valve 219 may be disposed above the liquid 20 such that the pressure release check valve 219 may be disposed above the surface level 204 of the liquid 20. Pressure release check valve 219 may be configured to allow an excess pressure above ambient pressure within the beverage chamber 210 to be released.

Beverage dispensing apparatus 210 may include a fluid outlet 216 (not shown in FIG. 2) fluidly connected to the beverage chamber 210 such that fluid outlet 216 may be adapted to transfer fluid, e.g. air, out of the beverage chamber 210. Fluid outlet 116 may be disposed at about the top wall portion 221. Fluid outlet 216 may be disposed along the circumferential wall portion 226 of the chamber housing 220. Fluid outlet 216 may be adapted to extract fluid, e.g. air, from the beverage chamber 210. Fluid outlet 216 may be connected to a conduit which may be connected to a fluid reservoir (not shown in FIG. 2). Fluid from the beverage chamber 110 may be channeled into the fluid source. Fluid outlet 216 may be disposed above the surface level 204 of the liquid 20 such that fluid flow out of the beverage chamber may be air. Fluid outlet 216 may be disposed below the surface level 204 of the liquid 20 such that fluid flow out of the beverage chamber 210 may be the liquid 20. As mentioned, the surface level 204 may be controlled to be above or below the fluid outlet 216 when the fluid outlet 116 is along the circumferential wall portion 226. A second fluid control valve (not shown in FIG. 2) may be fluidly connected to the fluid outlet 216. Second fluid control valve may be adapted to control fluid out of the beverage chamber 210 via the fluid outlet 216.

Figure 3:
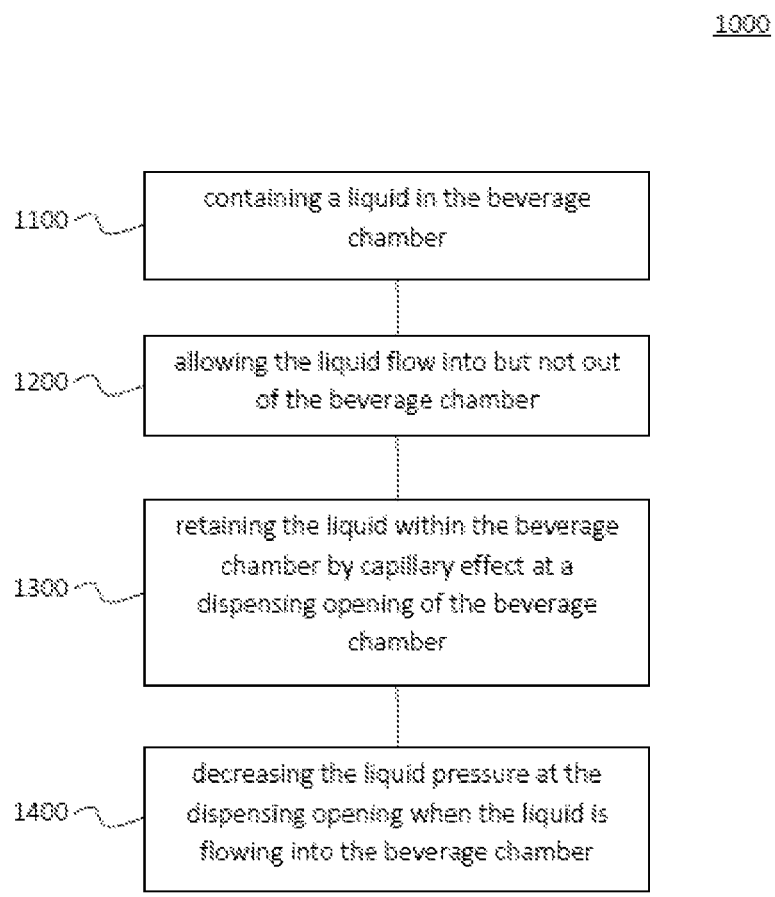
FIG. 3 shows a method of dispensing a beverage using a beverage dispensing apparatus according to various embodiments.

FIG. 3 shows a method 1000 of dispensing a beverage from beverage dispensing apparatus 100,200. As shown in 1100, the liquid 10 is contained in the beverage chamber 110,210. Liquid 10,20 is allowed to flow into but not out of the beverage chamber 110,210 as shown in 1200. In 1300, the liquid is retained within the beverage chamber 110,210 by capillary effect at dispensing opening 112,212 of the beverage chamber 110,210, the dispensing opening 112,212 is adapted to allow the liquid 10,20 therethrough to flow out of the beverage chamber 110,210, such that the dispensing opening 112,212 is subjected to a liquid pressure when the beverage chamber 110,210 contains the liquid 10,20. Liquid pressure is decreased at the dispensing opening 112,212 when the liquid 10,20 is flowing into the beverage chamber 110,210 so as to retain the liquid 10,20 within the beverage chamber 110,210 by surface tension of the liquid 10,20 due to the capillary effect and ambient pressure at the dispensing opening 112,212.

Referring to FIG. 1, the liquid 10 within the beverage chamber 110 may flow towards the dispensing opening 112. Liquid 10 may be retained within the beverage chamber 110 by surface tension due to the capillary effect at the dispensing opening 112 and atmospheric pressure against the liquid 10 at the dispensing opening 112. When the liquid 10 is being channeled into the beverage chamber 110 via the inlet 114, the pressure changer 130 is activated to decrease the liquid pressure at the dispensing opening 112. In this way, the liquid 10 is able to be retained within the beverage chamber 110 by the surface tension and atmospheric pressure. In the event that there is no liquid in the beverage chamber 110 initially, pressure changer 130 may be activated to decrease the air pressure within the beverage chamber 110 thereby causing air to flow into the beverage chamber 110 via the dispensing opening 112. In this way, the liquid 10 flowing into the beverage chamber 110 via the inlet 114 can be prevented from flowing out of the beverage chamber 110 via the dispensing opening 112. As can be understood by the skilled person, the liquid pressure within the beverage chamber 110 may be kept constant and not above the ambient pressure. As such, the liquid 10 may be kept from flowing out of the beverage chamber 110 through dispensing opening 112.

Pressure changer 130 may be a pump such that the pump may be activated to pump a fluid, e.g. air, out of the beverage chamber 110 to decrease the liquid pressure. It is also possible to activate the pressure changer 130 to increase the liquid pressure at the dispensing opening 112 to overcome the surface tension and ambient pressure to dispense the liquid 10 from the beverage chamber 110 via the dispensing opening 112.

Although FIG. 1 was being referred to, the same method may be used for the embodiment in FIG. 2.

Referring to FIG. 2, the air valve 218 may be activated to increase the liquid pressure within the beverage chamber 210 such that increasing the liquid pressure includes releasing air into the beverage chamber 210 so as to dispense the liquid 20 via the dispensing opening 212.

When air valve 218 is opened to allow air into the beverage chamber 210, the air pressure within the beverage chamber 210 is increased to the atmospheric pressure. Consequently, the liquid 20 is able to flow out of the beverage chamber 210 via the dispensing opening 212 under the influence of gravity. Conversely, when air valve 218 is closed, the fluid flow through the air valve 218 is stopped and dispensation of liquid 20 is accordingly stopped due to the surface tension and atmospheric pressure. Accordingly, by controlling the air valve 218, it is possible to control the dispensing of the liquid 20 from the beverage chamber 210. When the air valve 218 is opened, the liquid 20 may corresponding be dispensed from the beverage chamber 210 via the dispensing opening 212.

Pressure release check valve 219 may be used to release an excess pressure above ambient pressure within the beverage chamber 210. Pressure release check valve 219 may be configured to release air pressure before the threshold of the surface tension and atmospheric pressure is met so as to allow retention of the liquid 20 in the beverage chamber 210.

As described above, the first fluid control valve 215 may be connected to the inlet 214 to control of fluid into the beverage chamber 210. Liquid 20 may be introduced into the beverage chamber 210 via inlet 214. Beverage dispensing apparatus 200 may include first fluid control valve 215 to introduce liquid 20 into the beverage chamber 210. As liquid 20 is being introduced into the beverage chamber 210, the pressure changer 230, e.g. fluid pump 231, may be activated to draw fluid, e.g. air, out of the beverage chamber 210 thereby maintaining the pressure at about a constant level so as to keep the liquid 20 from flowing out from the beverage chamber 210 via the dispensing opening 212.

By withdrawing fluid, e.g. air, from the beverage chamber 210 via the fluid pump 231 as liquid 20 is being introduced into the beverage chamber 210 via the inlet 214, the liquid pressure at the dispensing opening 212 of the beverage chamber 210 may be kept in equilibrium with or lower than the atmospheric pressure. In this way, the liquid 20 within the beverage chamber 210 may be kept within the beverage chamber 210 and does not exit the beverage chamber 210 via the dispensing opening 212. When the liquid pressure exerted by the liquid 20 entering the beverage chamber 210 via the inlet 214 is being removed by the air being withdrawn from the beverage chamber 210 via the fluid pump 231, the liquid pressure at the dispensing opening 212 may be kept substantially the same as the liquid pressure at the dispensing opening 212 before the introduction of the liquid 20 via the inlet 214. Therefore, the liquid pressure at the dispensing opening 212 may be substantially in equilibrium with the atmospheric pressure and the liquid 20 may be kept within the beverage chamber 210. Although it is mentioned that liquid pressure at the dispensing opening 212 may be in equilibrium with the atmospheric pressure, a skilled person would appreciate that the liquid pressure at the dispensing opening 212 may be sufficiently less than the atmospheric pressure so that the liquid 20 may be kept within the beverage chamber 210. If the air removed from the beverage chamber 210 is more than the liquid 20 introduced into the beverage chamber 210, the liquid pressure at the dispensing opening 212 may be less than the atmospheric pressure. As such, air surrounding the beverage chamber 210 and outside the dispensing opening 212 may be pushed into the beverage chamber 210 and bubbles may be formed in the liquid 20. In other words, the excess air removed from the beverage chamber 210 due to the suction from the pump 231 may result in air being sucked into the beverage chamber 210 through the dispensing opening 212 of the beverage chamber 210. Therefore, there may be a bubbling effect similar to water being boiled and this effect may help to stir the liquid 20, e.g. tea and oxygenize the tea thereby enhancing the quality of the tea. The bubbling effect may shorten brewing time. The bubbling effect may also help to disperse beverage elements, e.g. tea leaves or coffee powder, from the partition (not shown in FIG. 2) to prevent accumulation of the beverage elements from clogging the partition.

Referring to FIG. 2, to add fluid into the beverage chamber 210, first fluid control valve 215 may be opened and fluid pump 231 may be activated. It is understood that air valve 218 may be closed to prevent fluid from entering or leaving the beverage chamber 210. Liquid 20 may be channeled into the beverage chamber 210 via the inlet 214 while air may be extracted from the beverage chamber 210 via the fluid pump 231. Inlet 214 may be fluidly connected to a fluid source (not shown in FIG. 1). Therefore, as the fluid is being added into the beverage chamber 210, the fluid pump 231 may cause air to be withdrawn from the beverage chamber 210 and into the atmosphere. Air may enter the beverage chamber 210 via the dispensing opening 212. Therefore, the pressure within the beverage chamber 210 may be kept constant and not above the ambient pressure. As such, the liquid 20 may be kept from flowing out of the beverage chamber 210 through dispensing opening 212. When the air valve 218 is opened, the liquid 10 may corresponding be dispensed from the beverage chamber 210 via the dispensing opening 212. Fluid pump 231 may be a mechanical device adapted to draw fluid, e.g. air or water, from the beverage chamber 210.

Figure 4:
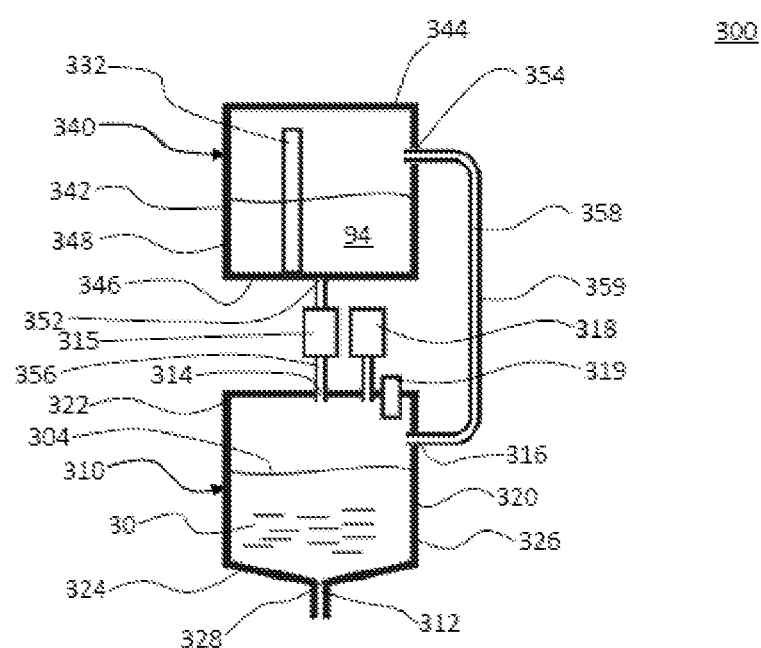
FIG. 4 shows another beverage dispensing apparatus according to various embodiments.

FIG. 4 shows the beverage dispensing apparatus 300 may further include a heating chamber 340 in fluid communication with the beverage chamber 310 via a fluid connection 356. Fluid connection 356 may be connected to the beverage chamber 310 via the inlet 314, such that the heating chamber 340 may be adapted to heat the liquid 30 before transferring the liquid 30 into the beverage chamber 310 to brew the liquid 30, e.g. beverage like tea, coffee. Heating chamber 340 may be adapted to hold a liquid 94 therein.

Heating chamber 340 may include a chamber housing 342 with a top wall portion 344 at about one end of the chamber housing 342, a bottom wall portion 346 at about the other end of the chamber housing 342 opposite the one end and a circumferential wall portion 348 extending from the top wall portion 344 to the bottom wall portion 346. Heating chamber 340 may include a fluid outlet 352 and a fluid inlet 354. Fluid outlet 352 and fluid inlet 354 may be disposed along the chamber housing 348 of the heating chamber 340. Fluid outlet 352 may be disposed along the bottom wall portion 346 of the chamber housing 342. Fluid outlet 352 may be disposed at a lowest point of the heating chamber 310 to allow fluid within the heating chamber 340 to flow out of the heating chamber 310 easily under the influence of gravity. Fluid inlet 354 may be disposed along the circumferential wall portion 348 of the chamber housing 342. Fluid inlet 354 may be disposed closer to the top wall portion 344 than the bottom wall portion 346. Fluid inlet 354 may be dispose above the fluid level in the heating chamber 310 so as to prevent backflow of the fluid from the heating chamber 310 into the beverage chamber 310. Fluid inlet 354 may be disposed closer to the bottom wall portion 346 than the top wall portion 344. Fluid inlet 354 may be disposed below the fluid level in the heating chamber 310. Fluid level in the heating chamber 340 may be kept within a certain height range from the bottom wall portion 346. Heating chamber 340 may include a sensor (not shown in FIG. 4) to detect the fluid level in the heating chamber 340 so as to control the amount of fluid within the heating chamber 340. Bottom wall portion 346 may be funnel shaped to direct liquid 94 within the heating chamber 340 towards the fluid outlet 352.

Heating chamber 340 may include a heating element 332 adapted to heat the fluid within the heating chamber 340. Heating element 332 may be a heating strip, a heating coil or a heating plate.

As described earlier, the beverage chamber 310 may include a chamber housing 320 with a top wall portion 322 at about one end of the chamber housing 320, a bottom wall portion 324 at about the other end of the chamber housing 320 opposite the one end and a circumferential wall portion 326 extending from the top wall portion 322 to the bottom wall portion 324. Bottom wall portion 324 may be tapered such that the bottom wall portion 324 may be sloped to an apex 328 so as to enable the liquid 30 within the beverage chamber 310 to flow to the apex 328. As shown in FIG. 3, the apex 328 may be dispose opposite the top wall portion 322 of the beverage chamber 310. Apex 328 may be pointing away from the top wall portion 322. Bottom wall portion 324 may extend from the circumferential wall portion 326 away from the top wall portion 322 and towards the apex 328. Dispensing opening 312 may be disposed at about the apex 328.

Beverage chamber 310 may include an outlet 316. Inlet 314 may be disposed at about the top wall portion 322. Inlet 314 may be disposed along the circumferential wall portion 326 of the chamber housing 320. Inlet 314 may be adapted to provide fluid flow into the beverage chamber 310. Inlet 314 may be disposed above the liquid 30 such that the inlet 314 may be disposed above the surface level 304 of the liquid 30. Inlet 314 may be disposed below the surface level 304 of the liquid 30 such that fluid flow into the beverage chamber 310 may flow into the liquid 30 under pressure. The amount of liquid 30 within beverage chamber 310 may be controlled via a sensor (not shown in FIG. 4). Accordingly, the surface level 304 of the liquid 30 may be controlled.

Accordingly, the surface level 104 may be controlled to be above or below the inlet 314 when the inlet 314 is along the circumferential wall portion 326. Outlet 316 may be disposed at about the top wall portion 322. Outlet 316 may be disposed along the circumferential wall portion 326 of the chamber housing 320. Outlet 316 may be disposed above the liquid 30 such that the outlet 316 may be disposed above the surface level 304 of the liquid 30. Outlet 316 may be disposed below the surface level 304 of the liquid 30 such that fluid flow out of the beverage chamber 310 may be the liquid 30. As mentioned, the surface level 304 may be controlled to be above or below the outlet 316 when the outlet 316 is along the circumferential wall portion 326.

Fluid connection 356 may be formed between the inlet 314 of the beverage chamber 310 and the fluid outlet 352 of the heating chamber 340. Fluid connection 356 may be a first fluid connection. A second fluid connection 358 may be formed between the outlet 316 of the beverage chamber 310 and the fluid inlet 354 of the heating chamber 340. Beverage dispensing apparatus 300 may include fluid control valve 315 along the fluid connection 356. Fluid control valve 315 may be adapted to control fluid flow along the fluid connection 356 from the heating chamber 340 to the beverage chamber 310. Fluid control valve 315 may be disposed between the beverage chamber 310 and the heating chamber 340.

Beverage dispensing apparatus 300 may include a fluid return conduit 359 connecting the heating chamber to the beverage chamber, such that a closed pressure loop is formed by at least the beverage chamber 310, fluid connection 356, heating chamber 340 and return conduit 359, such that when the liquid 30 is channeled from the heating chamber 340 into the beverage chamber 310 via the fluid connection 356, an under pressure zone formed in the heating chamber 340 by the channeled away liquid 30 draws the air from the beverage chamber 310 into the heating chamber 340 via the return conduit 359 thereby maintaining the pressure within the pressure loop.

As described earlier, the beverage chamber 310 may be a closed chamber such that pressure within the chamber may be maintained. For example, when beverage chamber 310 contains liquid 30, fluid communication via the inlet 314, outlet 316 and air valve 318 may be stopped, thereby leaving the dispensing opening 312 of the beverage chamber 310 to be the only opening of the beverage chamber 310 which may be closed by the liquid 30. Consequently, the liquid 30 may be kept within the beverage chamber 310 by atmospheric pressure and capillary effect. As such, the liquid 30 may be prevented from being dispensed from the beverage chamber 310. As may be appreciated by a skilled person, by controlling the pressure within the beverage chamber 310 or fluid flow into the beverage chamber 310, the dispensing of the liquid 30 may be controlled. Consequently, when the air valve 318 is opened, the liquid 30 may correspondingly be dispensed from the beverage chamber 310 via the dispensing opening 312.

Referring to FIG. 4, to transfer the fluid from the heating chamber 340 into the beverage chamber 310, fluid control valve 315 may be opened to allow liquid 94 within the heating chamber 340 to be released into the beverage chamber 310. Liquid 94 may be channeled into the beverage chamber 310 along the fluid connection 356 while fluid, e.g. air, may be extracted from the beverage chamber 310 and into the heating chamber 340 via the second fluid connection 358, i.e. fluid return conduit 359. Therefore, as the liquid 94 is being added into the beverage chamber 310, the vacuum left by the volume of liquid 94 in the heating chamber 340 may cause fluid, e.g. air, in the beverage chamber 310 to be withdrawn from the beverage chamber 310. Therefore, the liquid pressure within the beverage chamber 310 may be kept constant and not above the ambient pressure. As such, the liquid 30 may be kept from flowing out of the beverage chamber 310 through dispensing opening 312. When the air valve 318 is opened, the beverage 302 may correspondingly be dispensed from the beverage chamber 310 via the dispensing opening 312. Liquid 30 may be heated in the heating chamber 340 before transferring the liquid 30 into the beverage chamber 310 to brew the beverage, e.g. liquid 30.

As shown in FIG. 4, the outlet 316 of the beverage chamber 310 may be above the liquid 30 within the beverage chamber 310 and fluid inlet 354 of the heating chamber 340 may be above the fluid within the heating chamber 340. In this way, it can be seen that there may be an air connection between the top portion of the beverage chamber 310 and the top portion of heating chamber 340.

Beverage dispensing apparatus 300 may include a pressure release check valve 319 in fluid communication with the beverage chamber 310, such that the pressure release check valve 319 may be adapted to release an excess pressure above ambient pressure within the beverage chamber 310. Pressure release check valve 319 may be connected to the heating chamber 340 as excess pressure may be released from the heating chamber 340 as well. It may be beneficial to dispose pressure release check valve 319 at the heating chamber 340 as any excess pressure formed from the boiling of fluid in the heating chamber 340 may be released via pressure release check valve 319 before being channeled into the beverage chamber 310 so as to minimize pressure changes in the beverage chamber 310.

Figure 5:
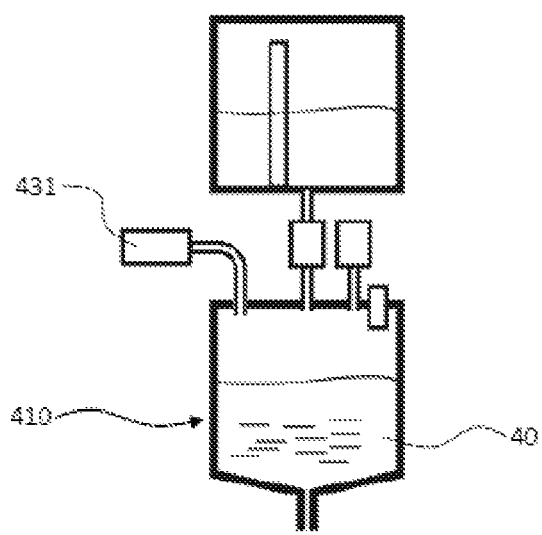
FIG. 5 shows another beverage dispensing apparatus according to various embodiments.

FIG. 5 shows another embodiment of the beverage dispensing apparatus. According to various embodiments, the beverage dispensing apparatus 400 in FIG. 5 may include a pressure changer. Pressure changer may include air pump 431. Air pump 431 may be in fluid communication with the beverage chamber 410, such that the air pump 431 may be adapted to pump air out of the beverage chamber 410. As described earlier, the air pump 431 may be activated to maintain or reduce the liquid pressure of the liquid 40 within the beverage chamber 410 so as to retain the liquid 40 within the beverage chamber 410 or create a bubbling effect within the beverage chamber 410.

Figure 6:
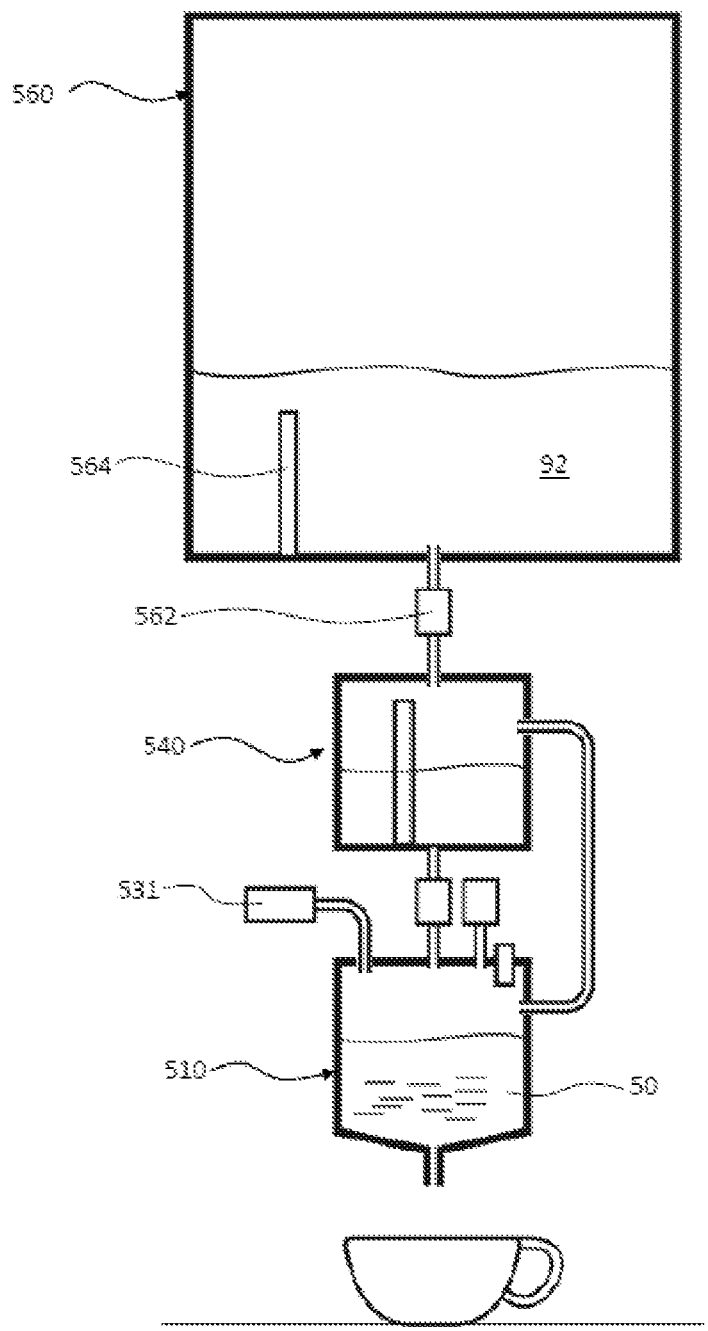
FIG. 6 shows a beverage dispensing apparatus of FIG. 1.

Referring to FIG. 6, the beverage dispensing apparatus 500 may include a pre-heating chamber 560 fluidly connected to the heating chamber 540. Pre-heating chamber 560 may be adapted to contain and heat the liquid 92 before channeling it into the heating chamber 540. Pre-heating chamber 560 may be adapted to provide fluid, e.g. liquid, to the heating chamber 540. Pre-heating chamber 560 may be fluidly connected to the heating chamber 540. Beverage dispensing apparatus 500 may include a valve 562. Valve 562 may be adapted to control the liquid flow from the pre-heating chamber 560 into the heating chamber 540. Valve 562 may be disposed between the pre-heating chamber 560 and the heating chamber 540. Valve 562 may be disposed along the fluid connection between the pre-heating chamber 560 and heating chamber 540.

The benefits of having a pre-heating chamber 560 and a heating chamber is the ability to provide parallel heating of the liquid within each chamber while the liquid 50 is being brewed within the beverage chamber 510. Pre-heating chamber 560 may be adapted to heat liquid 92 therein to a first temperature. Heating chamber 540 may be adapted to receive the liquid 92 from the pre-heating chamber 560 and heat the liquid to a second temperature for brewing a beverage. First temperature may be lower than the second temperature. For example, the pre-heating chamber 560 may heat the liquid 92 to about 80° C. Heating chamber 540 may be required to heat the liquid 94 therein to about 90° C. as it may be the required temperature to brew a beverage in the beverage chamber 510. As such, the liquid 92 from the pre-heating chamber 560, after entering the heating chamber 540 as liquid 94, may be required to be heated to 90° C. so that the liquid 94 entering the beverage chamber 510 may be the required temperature, i.e. 90° C. In another example, the temperature required for brewing the beverage may be about 80° C. As such, the liquid 92 in the pre-heated chamber 560, with a first temperature of 80° C., need not be heated further in the heating chamber 540. At most, the heating chamber 540 may be used to maintain the temperature of the liquid 94 before transferring it into the beverage chamber 510 for beverage brewing.

The liquid in the pre-heating chamber 560 can be on standby for the selected temperature to allow instant brewing on command. For multiple brewing rounds, the water for the next round may be heated in parallel to brewing, therefore multiple brews with varying or same brewing temperatures may be possible without delay. The water in the beverage chamber is heated to the temperature of the next brewing cycle while the brewing takes place. In this way, compared to heating from room temperature, the temperature difference between the first temperature of the pre-heating chamber 560 and the second temperature of the beverage chamber 510 may be relatively small, e.g. 5° C., 10° C., and the time and energy required to heat the liquid 94 to the required brewing temperature may be correspondingly small. Consequently, the time taken to brew a beverage using the beverage dispensing apparatus 500 may be relatively fast.

In other words, the beverage dispensing apparatus 500 in FIG. 6 may be a beverage brewing machine having the pre-heating chamber 560 adapted to heat liquid 92 therein to a first temperature, the heating chamber 540 is adapted to receive the liquid 92 from the pre-heating chamber 560 and heat the liquid 94 to a second temperature for brewing a beverage, and the beverage dispensing apparatus 510 is adapted to receive the liquid 92 from the heating chamber 540 to brew the beverage and dispense the beverage from the beverage dispensing apparatus 510 such that the heating chamber 540 may be adapted to heat the liquid 50 while the beverage dispensing apparatus 510 is brewing the beverage.

The pre-heating chamber 560 may include a heating element 564 adapted to heat up the liquid 92.

Figure 7:
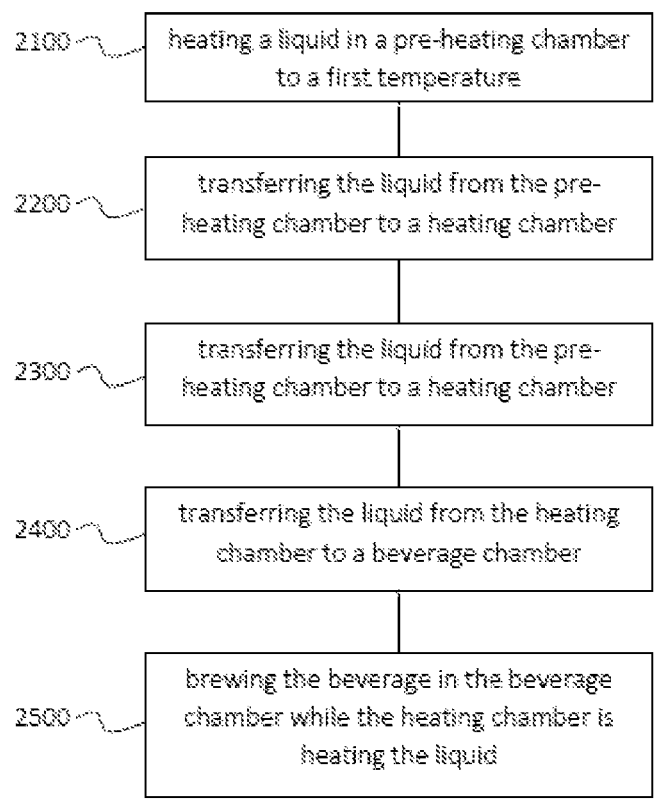
FIG. 7 shows a method of brewing a beverage according to various embodiments.

FIG. 7 shows a method 2000 of brewing a beverage. In the method, liquid is heated in the pre-heating chamber 460 to a first temperature as shown in 2100. In 2200, the liquid is transferred from the pre-heating chamber 460 to the heating chamber 440. Liquid is heated in the heating chamber 340 to a second temperature for brewing a beverage in 2300. In 2400, the liquid is transferred from the heating chamber 440 to the beverage chamber 410. Beverage is being brewed in the beverage chamber 410 while the heating chamber 440 is heating the liquid in 2500.

Referring to FIG. 6, the pre-heating chamber 560 may have a first capacity and the heating chamber 440 may have a second capacity such that the first capacity of the pre-heating chamber 560 may be at least equal to the second capacity of the heating chamber 540. Pre-heating chamber 560 may be at least twice the second capacity of the heating chamber 540. Pre-heating chamber 460 may be a plurality of times the second capacity of the heating chamber 540. In this way, the beverage brewing machine may be able to cater to multiple brewing cycles quickly.

Figure 8:
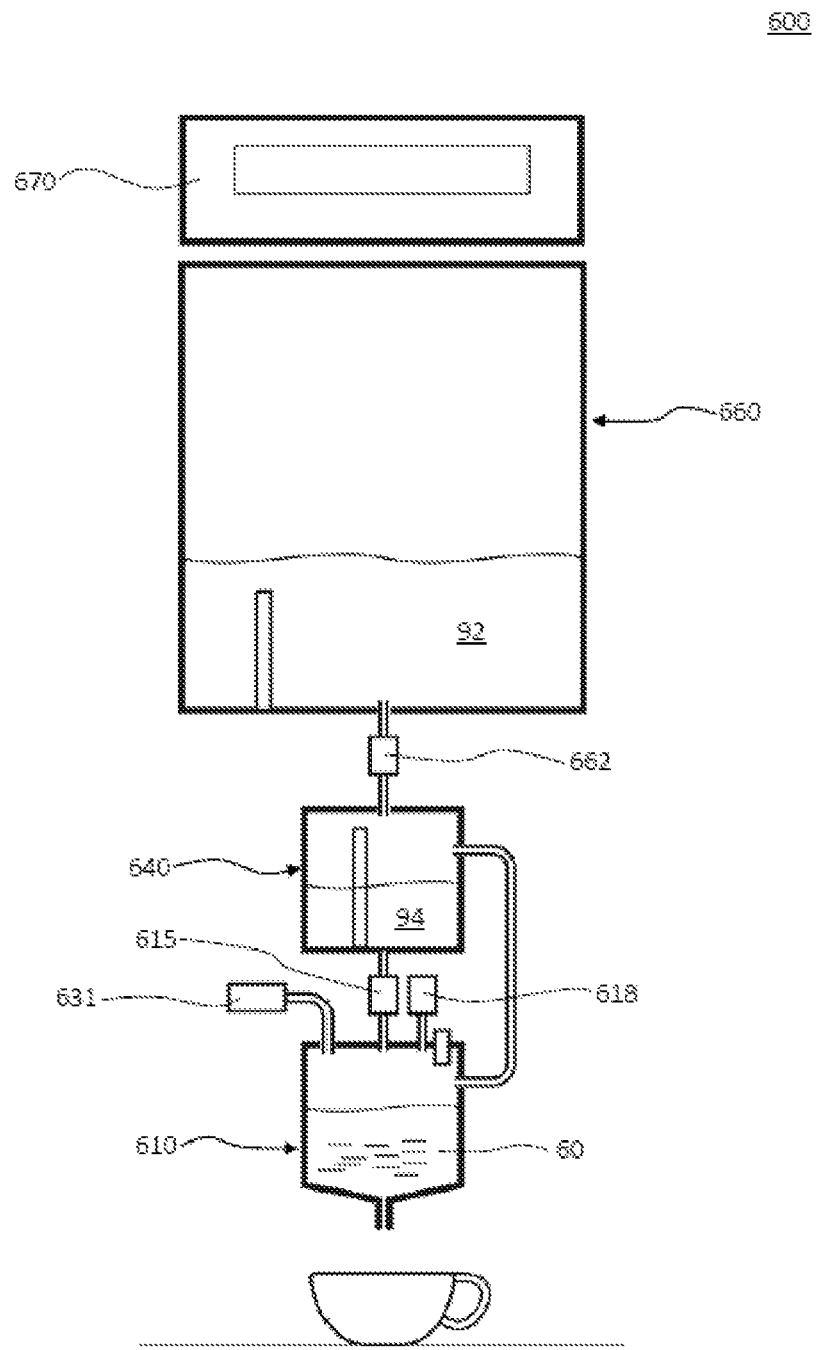
FIG. 8 shows a beverage dispensing apparatus according to various embodiments comprising a beverage dispensing apparatus of FIG. 1.

Referring to FIG. 8, the beverage dispensing apparatus 600 may include a controller 670 adapted to control the operations of the apparatus 600. Controller 670 may be in signal communication with at least one of the following: the pre-heating chamber 660, the valve 662, the heating chamber 640, the fluid control valve 615, the pump 631 and the air valve 618. Controller 670 may be used to control at least one of the following: the heating of liquid 92 in the pre-heating chamber 660, the valve 662 for releasing liquid flow into the heating chamber 640, the heating chamber 640 for heating of liquid therein, the fluid control valve 615 for releasing liquid 94 flow into the beverage chamber 610, the pump 631 for pumping air out of the beverage chamber 610 and air valve 618 for dispensing the liquid 60. Controller 670 may be an electronic controller.

According to various embodiments, a beverage dispensing apparatus may be provided. Beverage dispensing apparatus may include a beverage chamber, an inlet disposed at a top portion of the beverage chamber and a dispensing opening disposed at a bottom portion of the beverage chamber, the top portion being above the bottom portion. Beverage dispensing apparatus may include a pressure changer, e.g. a pump, preferably attached to the top portion of the beverage chamber. Alternatively, the beverage chamber may include an expandable portion at the top portion thereof, such that the beverage chamber may be expandable to increase the volume of the beverage chamber.

The invention claimed is:

1. A beverage dispensing apparatus comprising:
   a beverage chamber adapted to contain a liquid;
   a liquid inlet adapted to allow the liquid to flow into but not out of the beverage chamber;
   a valve-less dispensing opening adapted to retain the liquid within the beverage chamber by capillary effect, the valve-less dispensing opening adapted to allow the liquid therethrough to flow out of the beverage chamber, wherein the valve-less dispensing opening is subjected to a liquid pressure when the beverage chamber contains the liquid;
   a pressure changer operable to decrease the liquid pressure at the valve-less dispensing opening,
   wherein the pressure changer is operable to decrease the liquid pressure when the liquid flows into the beverage chamber so as to retain the liquid within the beverage chamber by surface tension of the liquid due to the capillary effect and ambient pressure at the valve-less dispensing opening;
   a heating chamber in fluid communication with the beverage chamber via a fluid connection, the fluid connection being connected to the beverage chamber via the liquid inlet, wherein the heating chamber is adapted to heat the liquid before transferring the liquid into the beverage chamber to brew the beverage; and
   a fluid return conduit connecting an air inlet of the heating chamber to an air outlet of the beverage chamber, wherein a closed pressure loop is formed by at least the beverage chamber, the fluid connection, the heating chamber and the return conduit, such that as the liquid is channeled from the heating chamber into the beverage chamber via the fluid connection when the beverage chamber already contains some liquid, an under pressure zone formed in the heating chamber by the channeled away liquid draws the air from the beverage chamber into the heating chamber via the return conduit thereby maintaining the pressure within the pressure loop without requiring the pressure changer to be operated to maintain the pressure, and wherein the valve-less dispensing opening is adapted to allow air outside the beverage chamber to be sucked into the beverage chamber through the valve-less dispensing opening to cause a bubbling effect in the liquid for stirring the liquid when the pressure changer decreases the liquid pressure at the valve-less dispensing opening to be less than the ambient pressure.

2. The beverage dispensing apparatus of claim 1, wherein the pressure changer is operable to increase the liquid pressure at the valve-less dispensing opening to overcome the surface tension and ambient pressure to dispense the liquid via the valve-less dispensing opening.

3. The beverage dispensing apparatus of claim 1, wherein the valve-less dispensing opening includes a tube extending from the beverage chamber.

4. The beverage dispensing apparatus of claim 1, wherein the beverage chamber comprises a top portion and a bottom portion, the top portion disposed above the bottom portion, wherein the liquid inlet and the pressure changer are disposed at the top portion and the valve-less dispensing opening is disposed at the bottom portion.

5. The beverage dispensing apparatus of claim 1, wherein the pressure changer includes a fluid pump adapted to pump fluid out of the beverage chamber.

6. The beverage dispensing apparatus of claim 5, wherein the fluid pump includes an air pump.

7. The beverage dispensing apparatus of claim 1, wherein the pressure changer includes an air valve adapted to release air into the beverage chamber to increase the liquid pressure so as to dispense the liquid via the valve-less dispensing opening.

8. The beverage dispensing apparatus of claim 1, wherein the beverage chamber comprises a pressure release check valve in fluid communication with the beverage chamber, wherein the pressure release check valve is adapted to release an excess pressure above ambient pressure within the beverage chamber.

9. The beverage dispensing apparatus of claim 1, further comprising a pressure release check valve in fluid communication with the beverage chamber, wherein the pressure release check valve is adapted to release an excess pressure above ambient pressure within the beverage chamber.

10. The beverage dispensing apparatus of claim 1, further comprising a fluid control valve disposed along the fluid connection, the fluid control valve to control fluid flow from the heating chamber to the beverage chamber.

11. The beverage dispensing apparatus of claim 1, further comprising an air pump in fluid communication with the beverage chamber, wherein the air pump is adapted to pump air out of the beverage chamber.

12. The beverage dispensing apparatus of claim 1, further comprising a pre-heating chamber fluidly connected to the heating chamber, the pre-heating chamber adapted to contain and heat the liquid before channeling it into the heating chamber.

13. The beverage dispensing apparatus of claim 12, wherein a valve is disposed between the pre-heating chamber and the heating chamber, the valve adapted to control the liquid flow from the pre-heating chamber into the heating chamber.

14. A beverage brewing machine comprising:

a pre-heating chamber adapted to heat a liquid therein to a first temperature;

a heating chamber adapted to receive the liquid from the pre-heating chamber and heat the liquid to a second temperature for brewing a beverage; and a beverage dispensing apparatus adapted to receive the liquid from the heating chamber to brew the beverage and dispense the beverage from it;

wherein the heating chamber is adapted to heat the liquid while the beverage dispensing apparatus is brewing the beverage, wherein the beverage dispensing apparatus comprises:

a beverage chamber adapted to contain a liquid;

a liquid inlet adapted to allow the liquid to flow into but not out of the beverage chamber, wherein the heating chamber is in fluid communication with the beverage chamber via a fluid connection, the fluid connection being connected to the beverage chamber via the liquid inlet, wherein the heating chamber is adapted to heat the liquid before transferring the liquid into the beverage chamber to brew the beverage;

a valve-less dispensing opening adapted to retain the liquid within the beverage chamber by capillary effect, the valve-less dispensing opening adapted to allow the liquid therethrough to flow out of the beverage chamber, wherein the valve-less dispensing opening is subjected to a liquid pressure when the beverage chamber contains the liquid; and a pressure changer operable to decrease the liquid pressure at the valve-less dispensing opening, wherein the pressure changer is operable to decrease the liquid pressure when the liquid flows into the beverage chamber so as to retain the liquid within the beverage chamber by surface tension of the liquid due to the capillary effect and ambient pressure at the valve-less dispensing opening;

and a fluid return conduit connecting an air inlet of the heating chamber to an air outlet of the beverage chamber, wherein a closed pressure loop is formed by at least the beverage chamber, the fluid connection, the heating chamber and the return conduit, such that when the liquid is channeled from the heating chamber into the beverage chamber via the fluid connection when the beverage chamber already contains some liquid, an under pressure zone formed in the heating chamber by the channeled away liquid draws the air from the beverage chamber into the heating chamber via the return conduit thereby maintaining the pressure within the pressure loop without requiring the pressure changer to be operated to maintain the pressure, and wherein the valve-less dispensing opening is adapted to allow air outside the beverage chamber to be sucked into the beverage chamber through the valve-less dispensing opening to cause a bubbling effect in the liquid for stirring the liquid when the pressure changer decreases the liquid pressure at the valve-less dispensing opening to be less than the ambient pressure.

* * * * *